United States Patent [19]
Tsai et al.

[11] Patent Number: 6,107,593
[45] Date of Patent: Aug. 22, 2000

[54] POWER APPARATUS FOR WIRE ELECTRIC DISCHARGE MACHINE

[75] Inventors: Cheng-Fu Tsai; Hsi-Pin Li, both of Hsinchu; Jui-Fang Liang, Chang Hwa; Hsiang-Kuo Li, Chung Li, all of Taiwan

[73] Assignee: Industrial Technology Research Institute, Taiwan

[21] Appl. No.: 09/216,611

[22] Filed: Dec. 21, 1998

[51] Int. Cl.$^7$ ................................ B23H 1/02; B23H 7/04
[52] U.S. Cl. .................................... 219/69.13; 219/69.12; 219/69.18
[58] Field of Search ............................. 219/69.13, 69.18, 219/69.12

[56] References Cited

U.S. PATENT DOCUMENTS

| | | | |
|---|---|---|---|
| 4,447,713 | 5/1984 | Tsurumoto et al. | 219/69.18 |
| 4,940,872 | 7/1990 | Futamura | 219/69.13 |
| 5,111,017 | 5/1992 | Futamura et al. | 219/69.18 |
| 5,317,122 | 5/1994 | Ito et al. | 219/69.18 |
| 5,986,232 | 11/1999 | Kaneko et al. | 219/69.18 |

Primary Examiner—Geoffrey S. Evans
Attorney, Agent, or Firm—Smith, Gambrell & Russell, LLP

[57] ABSTRACT

A wire electric-discharge machining apparatus with recycled electric power is provided, which can recycle the energy stored in the inductor of the discharge circuit to be used as the power source to both the ignition circuit and the discharging circuit, so that the use of electric power is more cost-effective. The wire electric-discharge machining apparatus is of the type having a positive-voltage ignition circuit, a negative-voltage ignition circuit, a discharging circuit, and a snubber circuit. The improvement to the wire electric-discharge machining apparatus comprises: a first voltage converting circuit coupled between the snubber circuit and the positive-voltage ignition circuit; a second voltage converting circuit coupled between the snubber circuit and the negative-voltage ignition circuit; and a third voltage converting circuit coupled between the snubber circuit and the discharging circuit. This foregoing wire electric-discharge machining apparatus is capable of recycling the excessive energy that is intended to be drained out in the prior art into reused power to the ignition circuit and discharging circuit. As a result, the wire electric-discharge machining apparatus not only can help save power consumption and thus electricity cost, but also can help prevent the excessive energy to cause damage to the internal circuitry of the wire electric-discharge machining apparatus.

12 Claims, 3 Drawing Sheets

POWER APPARATUS FOR WIRE ELECTRIC DISCHARGE MACHINE

BACKGROUND OF THE INVENTION

1. Field of the Invention

This invention relates to wire electric-discharge machining (WEDM) technology, and more particularly, to a wire electric-discharge machining apparatus with recycle electric power which is fetched from the snubber circuit of the apparatus and recycled to power the circuit parts that are used for ignition and discharging.

2. Description of Related Art

In a wire electric-discharge machining apparatus, the energy stored in the inductor in the discharging circuit should be drained out after each discharge; otherwise, it could cause damage to the internal circuitry of the apparatus. FIG. 1 is a schematic diagram of a conventional wire electric-discharge machining apparatus. As shown, the apparatus includes a low-voltage ignition circuit 1 having a positive voltage source V3 and a negative voltage source V2; a high-voltage discharging circuit 2 having a negative voltage source V1; and a snubber circuit 3 having a voltage source V4. After each discharge, the excessive energy stored into the inductive part of the discharging path is directed by the snubber circuit 3 to the capacitor C4 and then drained via the switching element SW1 to the ground. If this excessive energy remains in the apparatus and not drained out, it could cause instability to the discharging and also could cause damage to the internal circuit of the apparatus.

One drawback to the foregoing apparatus of FIG. 1, however, is that it would be wasteful in electrical power since the excessive energy is drained out instead of being recycled for use. Moreover, it would be costly to implement this apparatus since the ignition circuit 1 requires two voltage sources to realize.

SUMMARY OF THE INVENTION

It is therefore an objective of the present invention to provide a wire electric-discharge machining apparatus, which can recycle the energy stored in the inductive part of the discharging path of the wire electric-discharge machining apparatus to be used as the power to both the ignition circuit and the discharging circuit, so that the use of electric power is more cost-effective than the prior art.

It is another objective of the present invention to provide a wire electric-discharge machining apparatus, which can be implemented with reduced cost as compared to the prior art.

In accordance with the foregoing and other objectives of the invention, an improved wire electric-discharge machining apparatus is proposed. The wire electric-discharge machining apparatus is of the type having a positive-voltage ignition circuit, a negative-voltage ignition circuit, a discharging circuit, and a snubber circuit. In accordance with the invention, the improvement to the wire electric-discharge machining apparatus comprises: (a) a first voltage converting circuit coupled between the snubber circuit and the positive-voltage ignition circuit for recycling the excessive energy in the snubber circuit at each discharge into a positive voltage source to power the positive-voltage ignition circuit; (b) a second voltage converting circuit coupled between the snubber circuit and the negative-voltage ignition circuit for recycling the excessive energy in the snubber circuit at each discharge into a negative voltage source to power the negative-voltage ignition circuit; and (c) a third voltage converting circuit coupled between the snubber circuit and the discharging circuit for recycling the excessive energy in the snubber circuit at each discharge into a voltage source to power the discharging circuit.

The foregoing wire electric-discharge machining apparatus of the invention is capable of recycling the excessive energy that is intended to be drained out in the prior art into reused power to the ignition circuit and discharging circuit.

The first voltage converting circuit can be a conductive wire. Moreover, the voltage converting circuit for the positive-voltage ignition circuit, that voltage converting circuit for the negative-voltage ignition circuit, and the voltage converting circuit for the discharging circuit can be integrated into a single module to help make the overall wire electric-discharge machining apparatus more compact in size. The invention not only can help save power consumption and electricity cost, but also can help prevent the excessive energy to cause damage to the internal circuitry of the wire electric-discharge machining apparatus.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

In accordance with the invention, three preferred embodiments are disclosed in the following detailed description of the invention.

First Preferred Embodiment

Figure 2:
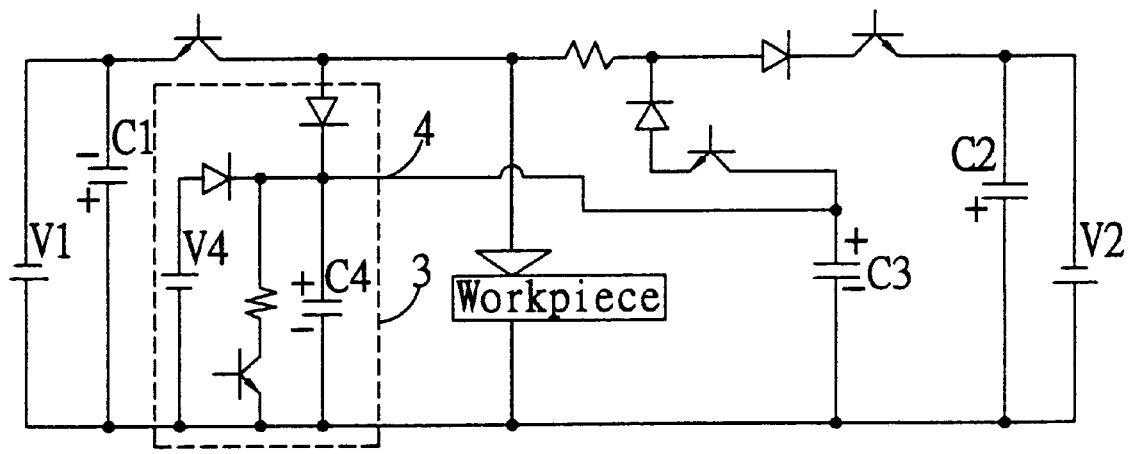
FIG. 2 is a schematic diagram of a first preferred embodiment of the wire electric-discharge machining apparatus according to the invention.

A first preferred embodiment of the wire electric-discharge machining apparatus of the invention is disclosed in the following with reference to FIG. 2.

Figure 1:
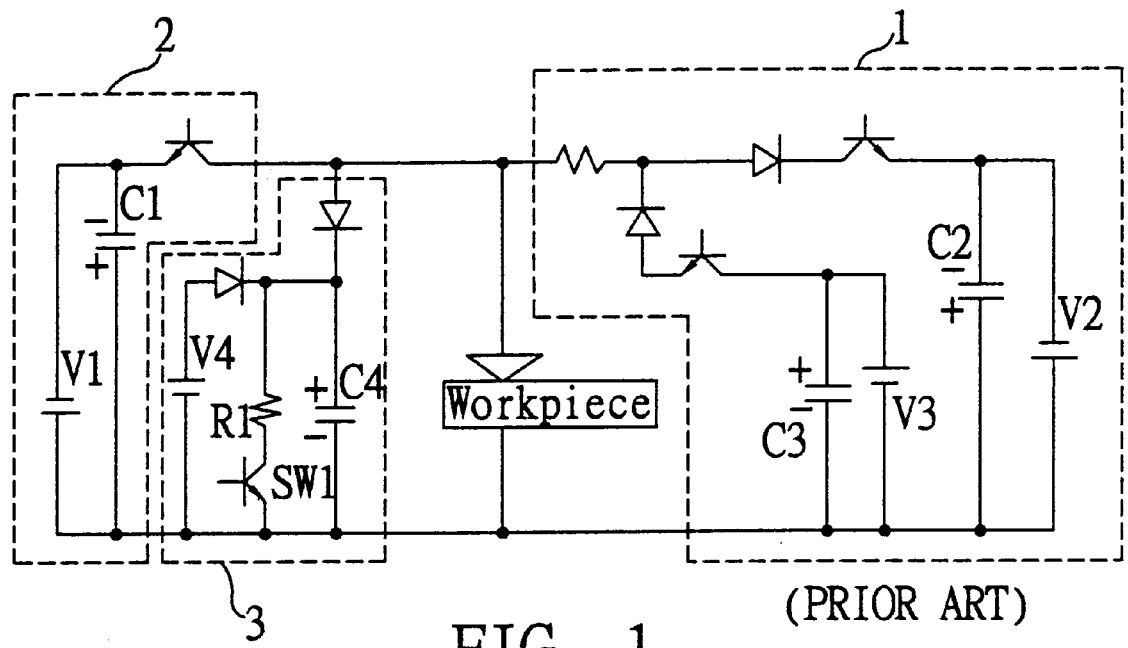
FIG. 1 is a schematic diagram of a conventional wire electric-discharge machining apparatus.

As shown, this embodiment is substantially identical in system configuration to the prior art of FIG. 1 except that the invention provides a conductive wire 4 for connecting the positive end of the snubber circuit 3 to the positive end of the capacitor C3 in the ignition circuit 1. This allows the voltage at the positive end of snubber circuit 3 to charge the capacitor C3, thus allowing the capacitor C3 to provide a positive voltage. Thanks to this provision, the voltage source V3 connected across the capacitor C3 in the ignition circuit 1 of the prior art of FIG. 1 can be eliminated. The component cost of the wire electric-discharge machining apparatus of this embodiment can thus be reduced as compared to the prior art.

Second Preferred Embodiment

A second preferred embodiment of the wire electric-discharge machining apparatus of the invention is disclosed in the following with reference to FIGS. 3, 4, and 5.

Figure 3:
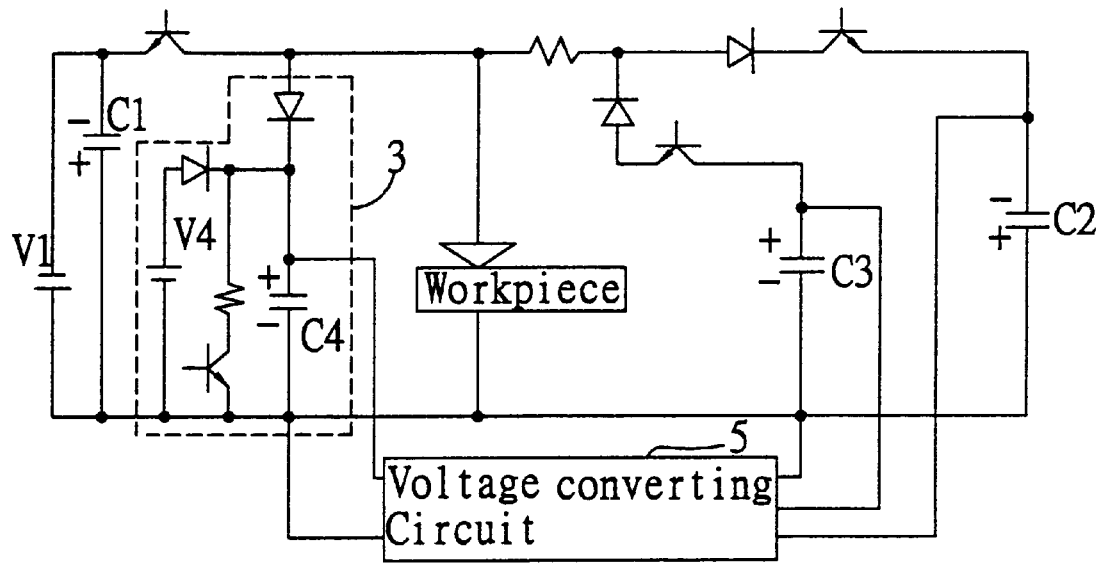
FIG. 3 is a schematic diagram of a second preferred embodiment of the wire electric-discharge machining apparatus according to the invention.

Referring to FIG. 3, this embodiment includes a voltage converting circuit 5 to the snubber circuit 3 to supply both a positive ignition voltage and a negative ignition voltage to the ignition circuit 1. In the case of positive ignition voltage, the system configuration of the voltage converting circuit 5 is as that shown in FIG. 4; and in the case of negative ignition voltage, the system configuration of the voltage converting circuit 5 is as that shown in FIG. 5. This allows both the positive ignition voltage fetched from the capacitor C3 for positive ignition and the negative ignition voltage fetched from the capacitor C2 for negative ignition to be both supplied from the snubber circuit 3, thus eliminating the necessity of using the voltage sources V2 and V3 in the ignition circuit 1 as in the case of the prior art of FIG. 1. The component cost of the wire electric-discharge machining apparatus of the invention can thus be reduced as compared to the prior art.

Figure 4:
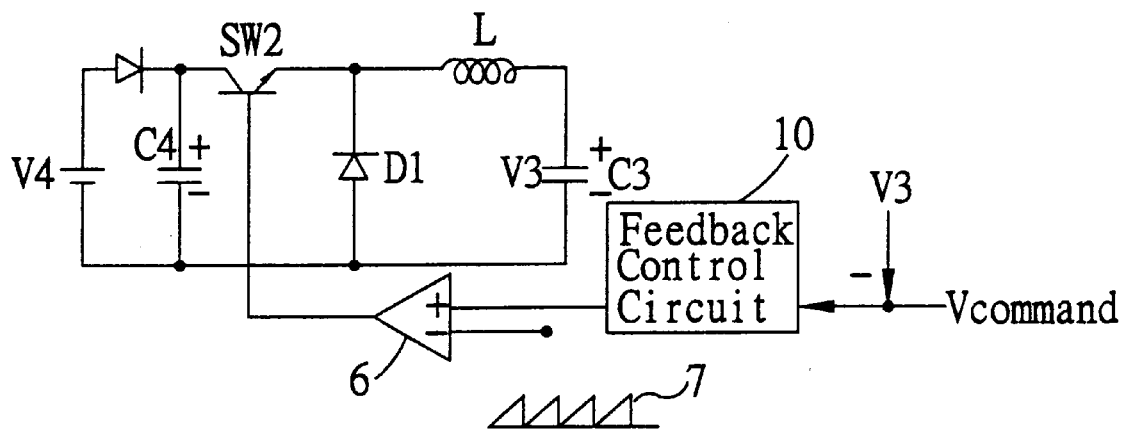
FIG. 4 is a schematic diagram showing a first circuit part of the voltage converting circuit utilized in the apparatus of FIG. 3 for supplying a positive ignition voltage.

FIG. 4 shows the system configuration of the voltage converting circuit 5 when used to supply a positive ignition voltage. As shown, the voltage converting circuit 5 includes a comparator 6 which compares a command signal $V_{command}$ indicative of the current ignition voltage V3 across the capacitor C3 against a sawtooth signal 7 to thereby generate a PWM (pulse width modulation) control signal to the switch SW2 to control the ON/OFF of the switch SW2. The command signal $V_{command}$ is transferred via a feedback control circuit 10 to the positive input end of the comparator 6. When the switch SW2 is switched to ON state by the PWM control signal, the energy stored in the snubber circuit 3 is drained through the switch SW2 to the inductor L, thereby being stored in the inductor L; and whereas when the switch SW2 is switched to OFF state, the energy stored in the inductor L is transferred via the diode D1 to charge the capacitor C3, thereby resulting in a positive ignition voltage V3 across the capacitor C3.

Figure 5:
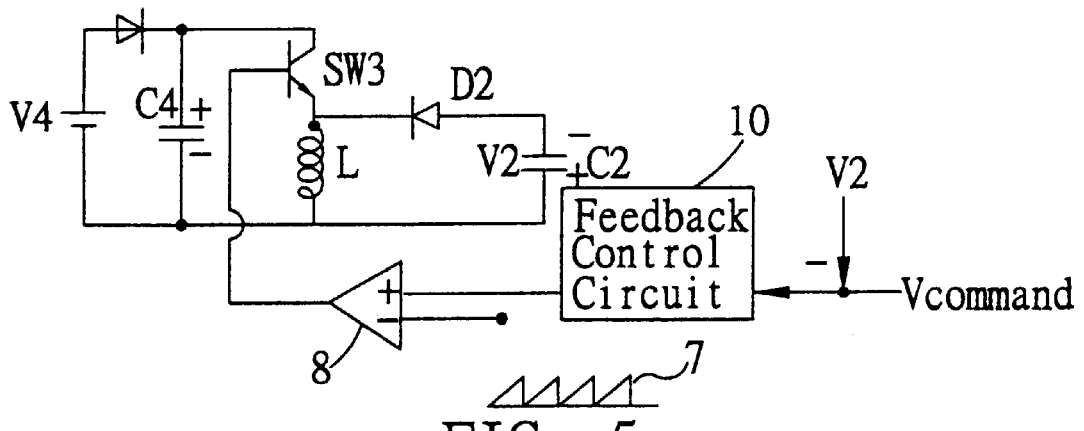
FIG. 5 is a schematic diagram showing a second circuit part of the voltage converting circuit utilized in the apparatus of FIG. 3 for supplying a negative ignition voltage.

FIG. 5 shows the system configuration of the voltage converting circuit 5 when used to supply a negative ignition voltage. As shown, the voltage converting circuit 5 includes a comparator 8 which compares a command signal $V_{command}$ indicative of the current ignition voltage V2 across the capacitor C2 against a sawtooth signal 7 to thereby generate a PWM control signal to control the ON/OFF of the switch SW3. The feedback signal $V_{command}$ is transferred via a feedback control circuit 10 to the positive input end of the comparator 8. When the switch SW3 is ON, the energy stored in the snubber circuit 3 is drained through the switch SW3 to the inductor L, thereby being stored in the inductor L; and whereas when the switch SW3 is OFF, the energy stored in the inductor L is transferred via the diode D2 to charge the capacitor C2, thereby resulting in a negative ignition voltage V2 across the capacitor C2.

Because the power stored in the snubber circuit 3 is about 0.6 kw, and the necessary power requested by the positive/negative ignition voltage is 100 W, so that it is enough to provide energy to the positive/negative ignition circuits from the energy stored in the snubber circuit 3.

Because the power stored in the snubber circuit 3 is about 0.6 kw, and the necessary power requested by the positive/negative ignition voltage is 100 W, so that it is enough to provide enough energy to the positive/negative ignition circuits from the energy stored in the snubber circuit 3.

Third Preferred Embodiment

Figure 6:
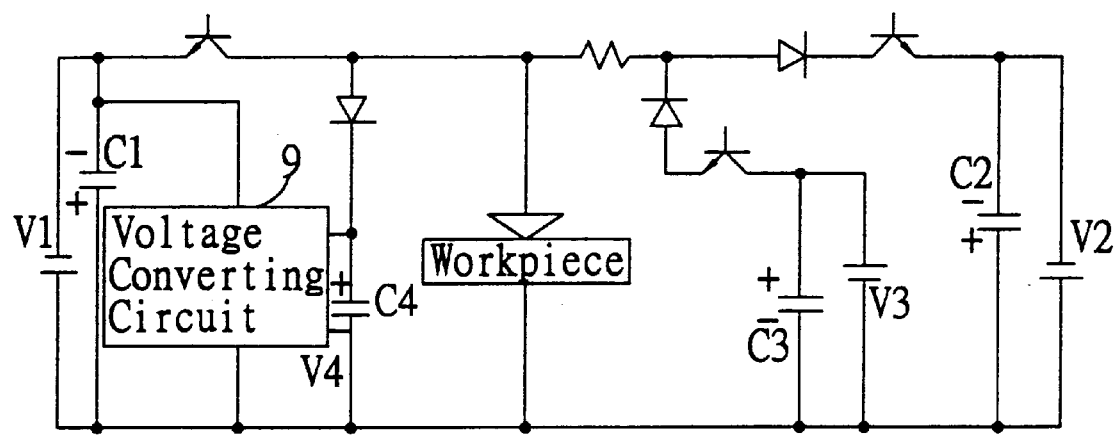
FIG. 6 is a schematic diagram of a third preferred embodiment of the wire electric-discharge machining apparatus according to the invention.

A third preferred embodiment of the wire electric-discharge machining apparatus of the invention is disclosed in the following with reference to FIG. 6.

As shown, this embodiment includes a voltage converting circuit 9 which is capable of converting the voltage V4 across the capacitor C4 for use to charge the capacitor C1 to V1. The system configuration of the voltage converting circuit 9 can be as that shown in FIG. 5. The discharging power from the capacitor C1 can be from 2 to 3 kW (kilowatt), so that the energy stored in the snubber circuit 3 can supply to the negative high voltage discharging source as a part of necessary energy.

In manufacture, the voltage converting circuit 5 and the voltage converting circuit 9 can be integrated as a single module so as to make the overall wire electric-discharge machining apparatus more compact in size.

In conclusion, the invention provides a wire electric-discharge machining apparatus which is capable of recycling the excessive energy that is intended to be drained out in the prior art into reused power to the ignition circuit and discharging circuit. As a result, the invention not only can help save power consumption and thus electricity cost, but also can help prevent the excessive energy to cause damage to the internal circuitry of the wire electric-discharge machining apparatus.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. In a wire electric-discharge machining apparatus having a positive-voltage ignition circuit, a negative-voltage ignition circuit, a discharging circuit, and a snubber circuit; the improvement comprising:

a first voltage converting circuit coupled between the snubber circuit and the positive-voltage ignition circuit for recycling the excessive energy in the snubber circuit at each discharge into a positive voltage source to power the positive-voltage ignition circuit.

2. In a wire electric-discharge machining apparatus having a positive-voltage ignition circuit, a negative-voltage ignition circuit, a discharging circuit, and a snubber circuit; the improvement comprising:

a voltage converting circuit coupled between the snubber circuit and the negative-voltage ignition circuit for recycling the excessive energy in the snubber circuit at each discharge into a negative voltage source to power the negative-voltage ignition circuit.

3. In a wire electric-discharge machining apparatus having a positive-voltage ignition circuit, a negative-voltage ignition circuit, a discharging circuit, and a snubber circuit; the improvement comprising:

a voltage converting circuit coupled between the snubber circuit and the discharging circuit for recycling the excessive energy in the snubber circuit at each discharge into a voltage source to power the discharging circuit.

4. The apparatus of claim 1, further comprising:

a second voltage converting circuit coupled between the snubber circuit and the negative-voltage ignition circuit for recycling the excessive energy in the snubber circuit at each discharge into a negative voltage source to power the negative-voltage ignition circuit.

5. The apparatus of claim 4, further comprising:

a third voltage converting circuit coupled between the snubber circuit and the discharging circuit for recycling the excessive energy in the snubber circuit at each discharge into a voltage source to power the discharging circuit.

6. The apparatus of claim 4, wherein the first voltage converting circuit and the second voltage converting circuit are integrated in one module.

7. The apparatus of claim 5, wherein the first voltage converting circuit, the second voltage converting circuit, and the third voltage converting circuit are integrated in one module.

8. The apparatus of claim 1, wherein the first voltage converting circuit is a conductive wire.

9. The apparatus of claim 1, wherein the first voltage converting circuit includes:

a comparator for comparing a command signal indicative of the current ignition voltage from the positive-voltage it circuit against a reference sawtooth signal to thereby generate a pulse width modulation control signal whenever the magnitude of the current ignition voltage is greater than the magnitude of the reference sawtooth signal;

a switch having an input end connected to the snubber circuit and an output end connected to a common node, the switch being switched to ON state, to connect the input end to the output end thereof when receiving the pulse width modulation control signal from the comparator;

a diode having a negative end connected to the common node and a positive end connected to both the negative end of the snubber circuit and the negative end of the positive-voltage ignition circuit; and an inductor having a first end connected to the common node and a second end connected to the positive end of the positive-voltage ignition circuit.

10. The apparatus of claim 2, wherein the voltage converting circuit includes:

a comparator for comparing a command signal indicative of the current ignition voltage from the negative-voltage ignition circuit against a reference sawtooth signal to thereby generate a pulse width modulation control signal whenever the magnitude of the current ignition voltage is greater than the magnitude of the reference sawtooth signal;

a switch having an input end connected to the snubber circuit and an, output end connected to a common node, the switch being switched to ON state to connect the input end to the output end thereof when receiving the pulse width modulation control signal from the comparator;

a diode having a negative end connected to the common node and a positive end connected to the negative end of the negative-voltage ignition circuit; and an inductor having a first end connected to the common node and a second end connected to both the positive end of the negative-voltage ignition circuit and the negative end of the snubber circuit.

11. The apparatus of claim 9, further comprising:

a feedback control circuit for transferring the command signal to the comparator.

12. The apparatus of claim 10, further comprising:

a feedback control circuit for transferring the command signal to the comparator.

* * * * *